United States Patent [19]

Sugio et al.

[11] 4,246,398

[45] Jan. 20, 1981

[54] METHOD FOR RECOVERING POLYPHENYLENE OXIDES

[75] Inventors: Akitoshi Sugio, Ohmiya; Atsuo Kuramoto, Kanamachi; Takao Kawaki; Hiroyuki Urabe, both of Tokyo; Tatsuhiko Kurihara, Matsudo; Isamu Masumoto, Yokkaichi; Akio Hasebe, Kanamachi, all of Japan

[73] Assignee: Mitsubishi Gas Chemical Company, Inc., Tokyo, Japan

[21] Appl. No.: 35,503

[22] Filed: May 2, 1979

[30] Foreign Application Priority Data

May 10, 1978 [JP] Japan .................................. 53-55324

[51] Int. Cl.³ ...................... C08G 65/44; C08G 65/46
[52] U.S. Cl. .................................... 528/496; 528/495; 528/499
[58] Field of Search ............... 528/496, 495, 499, 212

[56] References Cited

U.S. PATENT DOCUMENTS

| | | | |
|---|---|---|---|
| 3,306,874 | 2/1967 | Hay | 528/212 |
| 3,306,875 | 2/1967 | Hay | 528/212 |
| 3,923,738 | 12/1975 | Van Sorge | 528/496 |
| 4,011,200 | 3/1977 | Yonemitsu et al. | 528/212 |
| 4,067,851 | 1/1978 | Tomita et al. | 528/212 |

*Primary Examiner*—Lester L. Lee
*Attorney, Agent, or Firm*—Wenderoth, Lind & Ponack

[57] ABSTRACT

A method for recovering polyphenylene oxide having a high bulk density and a reduced content of fine particles from a solution of a polyphenylene oxide, which comprises adding a non-solvent composed of a lower alkyl alcohol and water to an aromatic solvent solution of a polyphenylene oxide substantially free from impurities to precipitate the polyphenylene oxide, the weight ratio of the aromatic solvent to the lower alkyl alcohol being from 1:1 to 1:2 and the weight ratio of the lower alkyl alcohol to water being from 1:0.005 to 1:0.1 in the precipitation system, and the addition of the non-solvent being controlled such that a liquid composition of the aromatic solvent, the lower alkyl alcohol and water forms a single phase; and recovering the precipitated polyphenylene oxide.

9 Claims, No Drawings

METHOD FOR RECOVERING POLYPHENYLENE OXIDES

This invention relates to a method for recovering a polyphenylene oxide.

Polyphenylene oxides are thermoplastic resins having very good thermal stability, chemical resistance and mechanical and electrical properties, and are used as molding compounds either alone or mixed with other resins such as polystyrene.

The polyphenylene oxides are the self-condensation products of monohydric, monocyclic phenols obtained by oxidizing these phenols with oxygen in the presence of a catalyst, and contain the structural unit of phenoxy group as a recurring unit. They include both homopolymers and copolymers. The homopolymers are derived from only one kind of phenol such as 2,6-dimethylphenol, and the copolymers are derived from at least two kinds of phenols such as 2,6-dimethylphenol and 2,3,6-trimethylphenol.

Process for producing polyphenylene oxides are disclosed, for example, in U.S. Pat. Nos. 3,306,874, 3,306,875, 4,011,200, and 4,067,851. Known processes for the production of polyphenylene oxides are carried out in the manner described below. First, a monohydric, monocyclic phenol is reacted with oxygen in the presence of a catalyst such as a copper-amine complex in a solvent capable of dissolving both the phenol and the resulting polyphenylene oxides, such as benzene, toluene, xylene, O-dichlorobenzene and pyridine, and thereby is self-condensed to form polyphenylene oxide as a result of oxidizing the hydrogen of the hydroxyl group of the phenol molecule and the hydrogen at the para-position of the phenole molecule. When the molecular weight of the resulting polyphenylene oxide reaches the desired polymerization degree, the reaction is terminated by inactivating the catalyst with an inactivator such as a mineral acid, a base or a chelating agent. The reaction mixture is then poured into a large amount of a non-solvent for the product, such as water or a lower alkyl alcohol (e.g., methanol or ethanol) of a lower alkyl ketone (e.g., acetone or methylethylketone) to precipitate the polyphenylene oxide. The precipitated polymer is recovered by centrifugal separation or filtration, and dried. Another method for the precipitation of the polymer comprises pouring the reaction mixture without inactivating the catalyst into a large amount of a non-solvent for the product when the molecular weight of polyphenylene oxide reaches the desired polymerization degree, and separating the precipitated polymer from the precipitating solution. However, since the polyphenylene oxide is precipitated in the presence of the catalyst residue and recovered, a large amount of the catalyst residue remains in the polyphenylene oxide. The resulting polymer is useless or has very poor performance in practical application. To remove the catalyst residue from the polymer, it may be possible to dissolve the polymer in an organic solvent and again recover it by precipitation, or to wash it with a large amount of a non-solvent. Such a method, however, will entail a high cost in the production of polyphenylene oxide.

For the foregoing reason, it has been the preferred practice to recover the polyphenylene oxide by a process which comprises adding an acid, an alkali, a chelating agent, etc. to the reaction mixture to inactivate the catalyst, which results in transferring the catalyst into the aqueous layer and terminating the polymerization reaction, then separating the aqueous layer to obtain an organic layer containing polyphenylene oxide, washing the organic layer with water or with an aqueous solution containing a chelating agent to remove the catalyst residue fully, and adding a lower alcohol or a lower ketone to the organic layer thereby to precipitate the polyphenylene oxide. According to this practice, the quality of the polymer can be improved over the aforesaid method as a result of the removal of the catalyst residue because the polymer is recovered by adding a lower alcohol to the polyphenylene oxide solution which is substantially free from impurities. It has been found however that the polymer obtained by the above practice usually contains a large proportion of fine powder particles and has a bulk density of as low as about 0.20 g/cc.

Polyphenylene oxides having such a low bulk density cause various inconveniences during the polymer production or during blending with other resins. For example, when the precipitated polymer is separated by a liquid-solid filtrating operation, its loss during the filtration increases, or the filtration resistance will increase to make filtration difficult, owing to its fine particles. The loss of the fine powder of the polymer increases during the drying operation or during pneumatic transportation of the polymer. Furthermore, when the blend of the polymer and compounding ingredients is kneaded and extruded using an extruder and pelletized by a pelletizer, the difficulty of uniform mixing of polyphenylene oxide with other compounding ingredients increases and the segregation of the individual compounding ingredients in the blend occurs. This causes fluctuation of the performance of the blends. Owing to the poor feedability of the blend into the extruder, the polymer is difficult to supply at a fixed rate to the extruder. To avoid this problem, the extruder can be only operated at a low operation rate, and therefore, it is impossible to use the extruder with high efficiency. Further, when the polyphenylene oxide is blended with another resin such as polystyrene, the pellets of resins such as polystyrene segregate at the bottom to cause phase separation, and uniform blending is impossible.

To remove the aforesaid defects, it is very desirable to obtain polyphenylene oxide particles having a high bulk density and containing a reduced amount of fine particles. The present invention provides a new method to solve these problems.

The present inventors have now found that the above problems can be solved when the precipitation of polyphenylene oxide by addition of a non-solvent to an organic solvent solution of polyphenylene oxide free from impurities is carried out in the presence of water and under such conditions that a liquid composition of the solvent, the non-solvent and water forms a single liquid phase.

SUMMARY OF THE INVENTION

According to this invention, there is provided a method for recovering polyphenylene oxide particles having a high bulk density and a reduced content of fine particles from an aromatic solvent solution of polyphenylene oxide, which comprises adding a non-solvent composed of a lower alkyl alcohol and water to the aromatic solvent solution of polyphenylene oxide substantially free from impurities to precipitate the polyphenylene oxide, the weight ratio of the aromatic solvent to the lower alkyl alcohol being from 1:1 to 1:2 and the weight ratio of the alkyl alcohol to water being from 1:0.005 to 1:0.1 in the precipitation system, and the addition of the non-solvent being controlled such that a liquid composition of the aromatic solvent, the lower alkyl alcohol and water forms a single phase; and recovering the precipitated polyphenylene oxide.

DETAILED DESCRIPTION OF THE INVENTION

The important feature of the present invention is that in a method for recovering a polyphenylene oxide by adding a lower alcohol as a non-solvent to an aromatic solvent solution of polyphenylene oxide substantially free from impurities such as catalyst residue to precipitate the polyphenylene oxide, water is added to the precipitation system so that a liquid composition of the aromatic solvent, the lower alcohol and water forms a single phase, and the amounts of the lower alcohol and water added to precipitate the polyphenylene oxide are maintained within specified ranges.

The polyphenylene oxide obtained by the method of this invention generally has a bulk density of at least 0.28 g/cc, and thus has a lower content of fine particles than polyphenylene oxides obtained by conventional methods. Accordingly, the method of this invention makes it possible to remove the defects of polyphenylene oxides produced by conventional methods.

It is necessary that the solution containing polyphenylene oxide to which the present invention is applied should not substantially include the catalyst and other impurities. If a non-solvent is added to the reaction mixture containing polyphenylene oxide with or without prior inactivation of the catalyst to precipitate the polyphenylene oxide, the recovered polymer will be contaminated with impurities such as the catalyst, and will fall in quality.

The polyphenylene oxide solution substantially free from impurities is prepared in the following manner.

In a self-condensation reaction of phenol to form polyphenylene oxide by oxidizing the phenol with oxygen in the presence of a catalyst, 1 mole of water forms from 1 mole of phenol. When the reaction mixture is allowed to stand after the end of the reaction, the reaction mixture separates into an organic layer containing the polymer and an aqueous layer. A part of the catalyst such as a copper-amine dissolves in the organic solvent layer. When the catalyst is inactivated with a mineral acid such as hydrochloric acid, the inactivated catalyst is insoluble in the organic solvent layer and therefore substantially all of the catalyst removes to the aqueous layer. Thus, the reaction mixture substantially free from impurities such as the catalyst can be obtained by removing the aqueous layer from the reaction mixture, and if desired, sufficiently washing the organic layer.

Instead of using aforesaid reaction mixture, the aromatic solvent solution of a polyphenylene oxide, which is prepared by dissolving the polyphenylene oxide in an aromatic solvent, is also used in the method of this invention. In this case, it is necessary to use purified polyphenylene oxides substantially free from impurities.

Suitable aromatic solvents for dissolving the polyphenylene oxide in this invention include benzene, toluene, xylene, ethylbenzene, chlorobenzene and o-dichlorobenzene. Benzene, toluene and xylene are preferred, and toluene is especially preferred. Since the solubility of the polyphenylene oxide in the solvent is limited, the upper limit of the concentration of the polyphenylene oxide in the solution is 25% by weight.

There is no particular lower limit to the concentration of the polyphenylene oxide. Generally, the preferred concentration of the polyphenylene oxide in the aromatic solvent solution is from 5 to 18% by weight.

Suitable lower alcohols which can be used as the non-solvent in this invention are methanol, ethanol, n-propanol, isopropanol, n-butanol, etc. Methanol is especially preferred.

It is important that in adding a non-solvent composed of the lower alkyl alcohol and water to the aromatic solvent solution of polyphenylene oxide in accordance with the method of the present invention, the addition of water should be controlled such that a liquid composition (the precipitation system) of the aromatic solvent, the lower alkyl alcohol and water forms a single phase. This is because if the precipitation system separates into two phases, the precipitated polymer becomes too tacky to be recovered by filtration, or the yield of polymer in the precipitating operation decreases.

Generally, a two-component liquid composed of an aromatic solvent and a lower alkyl alcohol always forms a single phase without separation into two phases. When water is added to this two-component liquid, and the amount of water exceeds a certain critical point, the resulting three-component liquid separates into two phases. The critical amount of water depends upon the composition of the two-component liquid, and is determined if the composition of the two-component liquid is given.

The amount of the lower alcohol to be added to the aromatic solvent solution of polyphenylene oxide in this invention should be such that the weight ratio of the aromatic solvent to the lower alcohol is from 1:1 to 1:2, preferably from 1:1.1 to 1:1.8. The amount of water added should be such that the weight ratio of the lower alcohol to water is from 1:0.005 to 1:0.1, preferably from 1:0.01 to 1:0.1.

When the amount of the lower alcohol is less than the lower limit specified hereinabove, the bulk density of the resulting polymer cannot exceed 0.28 g/cc, and it is difficult to precipitate the polymer quantitatively.

When the amount of the lower alcohol exceeds the upper limit specified above, the increase of the bulk density of the polymer may be expected. However, since the sufficient amount of the lower alcohol required for the quantitative precipitation of polymer corresponds to the aromatic solvent/lower alcohol ratio of at least 1, use of more alcohol is not practical in view of energy required for the distillation of the alcohol.

When the amount of water added is smaller than the lower limit specified above, no substantial increase in the bulk density of the polymer can be expected. When the amount of water is larger than the upper limit specified above, the amount of lower alcohol must be increased to maintain the three-component liquid composition of the aromatic solvent, the lower alcohol and water as a single phase, and the result would be the same as in the case of using a larger amount of the lower alcohol.

When it is desired to perform the precipitating recovery of the polymer continuously by applying the method of this invention to the reaction mixture obtained by the self-condensation reaction of a phenol, the following procedure would be suitable.

A phenol is oxidized with oxygen in the presence of a catalyst in an aromatic solvent to form a polyphenylene oxide. After the reaction, a mineral acid such as hydrochloric acid is added to the reaction mixture with stirring to inactivate the catalyst. Then, the stirring is stopped, and the reaction mixture is allowed to stand to separate it into an organic solvent layer and an aqueous layer. If desired, water may be added at this time to increase the efficiency of extracting the inactivated catalyst. The water layer is then removed. The organic solvent layer separated from the aqueous layer is substantially free from the catalyst and water. The solution is continuously sent to a precipitation vessel equipped with a stirrer, and a non-solvent composed of lower alkyl alcohol and water is added to precipitate the polyphenylene oxide.

In the aforesaid continuous method, the treatment of removing the catalyst from the reaction mixture is essential for obtaining polyphenylene oxide having good performance, and cannot be omitted. In the continuous method, it is not always necessary to add the non-solvent in one step. It may be effected by a continuous multistage cascade method. In this case, it is necessary to add the non-solvent in such a manner that in each of the multistages, the three-component liquid composition (the precipitation system) of the aromatic solvent, the lower alkyl alcohol and water should be maintained as a single phase, and the composition of the three-component liquid in the final stage should be within the above-specified range.

The method of this invention can also be applied batchwise to the reaction mixture obtained by the self-condensation reaction of a phenol. In this case, too, it is necessary to perform the treatment of removing the catalyst from the reaction mixture prior to the addition of the non-solvent.

In performing the method of this invention, the temperature at which the precipitation is effected is not particularly important. Preferably, the temperature is 20° to 50° C.

The precipitation vessel used in the precipitation step of this invention needs not to be of any special type, and may be of any type equipped with a stirrer.

The polyphenylene oxide precipitated by the method of this invention is recovered by an ordinary method such as centrifugal separation, filtration or decantation, and then dried to remove the remaining solvent.

The polyphenylene oxide used in the method of this invention is a known polymer which generally has a phenoxy group of the following structure as a repeating unit.

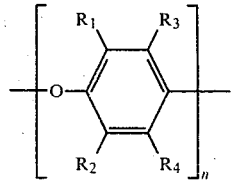

(1)

In formula (1), n is an integer of at least 50; $R_1$ represents a monovalent substituent selected from the group consisting of hydrogen, alkyl groups having 1 to 5 carbon atoms, haloalkyl groups having 1 to 5 carbon atoms (with at least two carbon atoms present between the halogen and the phenyl nucleus), alkoxy groups having 1 to 5 carbon atoms and haloalkoxy groups having 1 to 5 carbon atoms (with at least two carbon atoms present between the halogen and the phenyl nucleus); and $R_2$, $R_3$ and $R_4$ are the same as $R_1$, or halogens; with the proviso that $R_1$, $R_2$, $R_3$, and $R_4$ do not represent substituents in which the α-carbon atom is a tertiary carbon atom.

The polymer having the structure expressed by this general formula embraces not only homopolymers but also copolymers composed of at least two monocyclic phenoxy groups.

Of these polyphenylene oxides, poly(2,6-dimethyl-1,4-phenylene) oxide and a copolymer having a 2,6-dimethylphenoxy group and a 2,3,6-trimethylphenoxy group are especially useful.

The following Examples illustrate the present invention more specifically without any intention of limiting it thereto.

EXAMPLE 1

Poly(2,6-dimethyl-1,4-phenylene) oxide from which impurities had been removed by purification was dissolved in toluene to prepare a solution having a polymer concentration of 9.0% by weight. 121 Kg of the solution was placed in a precipitation vessel, and stirred by means of a reciprocating stirrer. Methanol (168 Kg) and 9 Kg of water were fed into the stirred solution by pumps over the course of about 20 minutes to precipitate the polyphenylene oxide at 25° C.

In the precipitating solution, the weight ratio of toluene:methanol:water was 1:1.53:0.08, and the precipitating solution system formed a single phase.

The polyphenylene oxide obtained by this method had a bulk density of 0.37 g/cc, and the following particle size distribution.

| Sieve (mesh) | 40 | 60 | 100 | 145 | 200 | 250 | fine |
|---|---|---|---|---|---|---|---|
| Residue on sieve (% by weight) | 39.9 | 31.3 | 17.0 | 5.2 | 1.3 | 2.5 | 2.9 |

COMPARATIVE EXAMPLE 1

Polyphenylene oxide was precipitated under the same conditions as in Example 1 except that a non-solvent composed only of 168 Kg of methanol was used instead of the non-solvent composed of 168 Kg of methanol and 9 Kg of water.

The resulting polymer had a bulk density of 0.20 g/cc which was much lower than that in Example 1. The polymer had the following particle size distribution, showing a marked increase in the proportion of fine particles.

| Sieve (mesh) | 42 | 60 | 100 | 145 | 200 | 250 | fine |
|---|---|---|---|---|---|---|---|
| Residue on sieve (% by weight) | 33.4 | 19.5 | 19.7 | 10.2 | 3.1 | 5.1 | 8.8 |

EXAMPLE 2

Example 1 was repeated except that the temperature at the time of precipitation was changed to 50° C. The resulting polymer particles had a bulk density of 0.40 g/cc.

EXAMPLE 3

Example 1 was repeated except that the amount of water was changed to 1 Kg, and the precipitation temperature was changed to 40° C. The resulting polymer had a bulk density of 0.29 g/cc.

EXAMPLE 4

10.45 Kg of 2,6-dimethylphenol and 613 g of 2,3,6-trimethylphenol were dissolved in 110 Kg of toluene, and the solution was oxidatively polymerized in the presence of 55 g of cuprous iodide and 8 Kg of n-butylamine while passing air into it. When the intrinsic viscosity of the resulting polymer reached about 0.53 dl/g (measured at 25° C. in chloroform), 3 moles of catechol and 5 moles of sodium sulfite, per mole of the cuprous iodide, were added as stoppers to terminate the reaction. The reaction mixture composed of an aqueous layer and an organic layer was centrifugal to separate the aqueous layer. The resulting organic layer was washed thoroughly with water, and the water contained in the organic layer was separated by a liquid-liquid centrifugal separator. There was obtained a toluene solution of polyphenylene oxide copolymer which was substantially free from water and catalyst. The polymer solution was fed into a precipitation vessel through a conduit by means of a pump. Simultaneously, 188 Kg of methanol was fed through another conduit, and 10.4 Kg of water from still another conduit. These materials were fed in their entirety over the course of about 25 minutes. The resulting polymer had a bulk density of 0.33 g/cc.

In the precipitation solution, the weight ratio of toluene:methanol:water was 1:1.71:0.095.

EXAMPLE 5

The toluene solution of polyphenylene oxide copolymer obtained by the method of Example 4 was concentrated to a polymer concentration of about 15% by weight using an evaporator. The concentrated solution was fed into a stirred first precipitation vessel through a conduit, and simultaneously, methanol and water were fed through two separate conduits so that the weight ratio of toluene:methanol:water in the precipitating solution in the precipitation vessel was maintained at 1:0.65:0.051. In the first precipitation vessel, the polymer partly precipitated, and the precipitating solution became a slurry. The slurry overflowed, and entered a second precipitation vessel. Simultaneously, methanol was fed through a conduit so that the weight ratio of toluene:methanol:water in the solution became 1:1.24:0.048. Thus, the polymer was completely precipitated in the second precipitation vessel. The resulting polymer had a bulk density of 0.42 g/cc, and the following particle size distribution.

| Sieve (mesh) | 42 | 60 | 100 | 145 | 200 | 250 | fine |
|---|---|---|---|---|---|---|---|
| Residue on sieve (% by weight) | 59 | 13 | 9 | 6 | 5 | 5 | 3 |

EXAMPLE 6

1.0 Kg of poly(2,6-dimethyl-1,4-phenylene) oxide having an intrissic viscosity of 0.52 dl/g (measured at 25° C. in chloroform) was completely dissolved in 10 Kg of benzene. While the solution was vigorously stirred, 21.1 Kg of hydrous methanol containing 4.3% by weight of water was added to the solution over the course of about 30 minutes. The resulting polymer had a bulk density of 0.402 g/cc.

EXAMPLE 7

Example 6 was repeated except that xylene was used instead of benzene. The resulting polymer had a bulk density of 0.336 g/cc.

What we claim is:

1. A method for recovering polyphenylene oxide having a high bulk density and a reduced content of fine particles from a solution of a polyphenylene oxide, which comprises adding a non-solvent composed of a lower alkyl alcohol and water to an aromatic solvent solution of a polyphenylene oxide substantially free from impurities to precipitate the polyphenylene oxide, the weight ratio of the aromatic solvent to the lower alkyl alcohol being from 1:1 to 1:2 and the weight ratio of the lower alkyl alcohol to water being from 1:0.005 to 1:0.1 in the precipitation system, and the addition of the non-solvent being controlled such that a liquid composition of the aromatic solvent, the lower alkyl alcohol and water forms a single phase; and recovering the precipitated polyphenylene oxide.

2. The method of claim 1 wherein the aromatic solvent is at least one member selected from the group consisting of benzene, toluene and xylene.

3. The method of claim 2 wherein the aromatic solvent is toluene.

4. The method of claim 1 wherein the lower alkyl alcohol is at least one member selected from the group consisting of methanol, ethanol and isopropanol.

5. The method of claim 4 wherein the lower alkyl alcohol is methanol.

6. The method of claim 1 wherein the polyphenylene oxide comprises a structural unit of the following formula

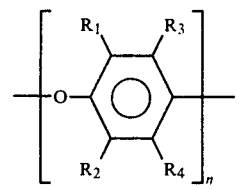

wherein n is an integer of at least 50, $R_1$ represents a monovalent substituent selected from the group consisting of a hydrogen atom, alkyl groups having 1 to 5 carbon atoms, haloalkyl groups having 1 to 5 carbon atoms with at least two carbon atoms present between the halogen and the phenyl nucleus, alkoxy groups having 1 to 5 carbon atoms and haloalkoxy groups having 1 to 5 carbon atoms with at least two carbon atoms between the halogen and the phenyl nucleus, and $R_2$, $R_3$ and $R_4$ are the same as $R_1$ or represent a halogen atom, with the proviso that $R_1$, $R_2$, $R_3$ and $R_4$ do not represent substituents in which the α-carbon atom is a tertiary carbon atom.

7. The method of claim 6 wherein $R_1$ and $R_2$ are methyl groups, and $R_3$ and $R_4$ are hydrogen atoms.

8. The method of claim 6 wherein the polyphenylene oxide is a polyphenylene oxide copolymer containing a unit of the formula in which $R_1$ and $R_2$ are methyl groups and $R_3$, $R_4$ are hydrogen atoms and a unit of the formula in which $R_1$, $R_2$ and $R_3$ are methyl groups and $R_4$ is a hydrogen atom.

9. The method of claim 1 wherein the polyphenylene oxide solution, the lower alcohol and water are continuously added, and the precipitated polyphenylene oxide is withdrawn continuously.

* * * * *